(12) United States Patent
Tsuchiya et al.

(10) Patent No.: US 12,351,502 B2
(45) Date of Patent: Jul. 8, 2025

(54) OPTICAL GLASS AND OPTICAL ELEMENT

(71) Applicant: Sumita Optical Glass, Inc., Saitama (JP)

(72) Inventors: Koichi Tsuchiya, Saitama (JP); Hideaki Takaku, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 525 days.

(21) Appl. No.: 16/493,528

(22) PCT Filed: Apr. 18, 2017

(86) PCT No.: PCT/JP2017/015578
§ 371 (c)(1),
(2) Date: Sep. 12, 2019

(87) PCT Pub. No.: WO2018/185946
PCT Pub. Date: Oct. 11, 2018

(65) Prior Publication Data
US 2020/0131072 A1    Apr. 30, 2020

(30) Foreign Application Priority Data

Apr. 5, 2017 (JP) ................................ 2017-075549

(51) Int. Cl.
| C03B 37/012 | (2006.01) |
| C03C 3/066 | (2006.01) |
| C03C 3/068 | (2006.01) |
| C03C 3/078 | (2006.01) |
| C03C 3/089 | (2006.01) |
| C03C 3/095 | (2006.01) |
| C03C 13/04 | (2006.01) |

(52) U.S. Cl.
CPC ............ *C03B 37/012* (2013.01); *C03C 3/066* (2013.01); *C03C 3/068* (2013.01); *C03C 3/078* (2013.01); *C03C 3/089* (2013.01); *C03C 3/095* (2013.01); *C03C 13/04* (2013.01)

(58) Field of Classification Search
None
See application file for complete search history.

(56) References Cited

U.S. PATENT DOCUMENTS

| 2004/0220038 | A1* | 11/2004 | Wolff ...................... | C03C 3/062 |
| | | | | 501/64 |
| 2012/0302423 | A1* | 11/2012 | Kinoshita ................ | C03C 3/078 |
| | | | | 501/37 |
| 2014/0376868 | A1 | 12/2014 | Ritter et al. | |

FOREIGN PATENT DOCUMENTS

| CN | 104039725 A | 9/2014 |
| JP | S56155041 A | 12/1981 |
| JP | S6046945 A | 3/1985 |
| JP | S62123040 A | 6/1987 |
| JP | 2004010365 A | 1/2004 |
| JP | 2004256389 A | 9/2004 |
| JP | 2008019103 A | 1/2008 |
| JP | 2010189197 A | 9/2010 |
| JP | 2015508385 A | 3/2015 |
| JP | 6006894 B1 | 10/2016 |
| WO | 2012050119 A1 | 4/2012 |

OTHER PUBLICATIONS

Nov. 25, 2020, the Extended European Search Report issued by the European Patent Office in the corresponding European Patent Application No. 17904642.0.
Feb. 7, 2022, Office Action issued by the China National Intellectual Property Administration in the corresponding Chinese Patent Application No. 201780088292.0.
Sep. 13, 2021, Office Action issued by the China National Intellectual Property Administration in the corresponding Chinese Patent Application No. 201780088292.0.
Oct. 8, 2019, International Preliminary Report on Patentability issued in the International Patent Application No. PCT/JP2017/015578.
May 16, 2018, Notice of Reasons for Refusal issued by the Japan Patent Office in the corresponding Japanese Patent Application No. 2017-075549.
May 23, 2017, International Search Report issued in the International Patent Application No. PCT/JP2017/015578.
Oct. 19, 2017, Office Action issued by the Taiwan Intellectual Property Office in the corresponding Taiwanese Patent Application No. 106113450.

(Continued)

*Primary Examiner* — Chris H Chu
(74) *Attorney, Agent, or Firm* — KENJA IP LAW PC

(57) ABSTRACT

An optical glass is provided which does not contain components negatively affecting the environment as environmental loads, and is less colored while having a refractive index maintained moderately high. The optical glass has a composition including, in % by mass, 30% or more and 47% or less of $SiO_2$, 0% or more and 10% or less of $B_2O_3$, 3% or more and 12% or less of $Na_2O$, 0% or more and 5% or less of $Li_2O$, 0% or more and 3.8% or less of CaO, 28% or more and 43% or less of BaO, 3% or more and 16% or less of ZnO, 0% or more and 8% or less of $ZrO_2$, 0% or more and 15% or less of $La_2O_3$, where $Sb_2O_3$ is excluded from the composition, wherein the optical glass does not contain any of PbO, $As_2O_3$, and $K_2O$.

17 Claims, No Drawings

(56) References Cited

OTHER PUBLICATIONS

Mar. 26, 2021, Office Action issued by the China National Intellectual Property Administration in the corresponding Chinese Patent Application No. 201780088292.0.
Feb. 8, 2023, Communication pursuant to Article 94(3) EPC issued by the European Patent Office in the corresponding European Patent Application No. 17904642.0.
May 27, 2024, Office Action issued by the China National Intellectual Property Administration in the corresponding Chinese Patent Application No. 201780088292.0.
Mar. 21, 2024, Office Action issued by the China National Intellectual Property Administration in the corresponding Chinese Patent Application No. 201780088292.0.

* cited by examiner

OPTICAL GLASS AND OPTICAL ELEMENT

TECHNICAL FIELD

The present disclosure relates to an optical glass and an optical element.

BACKGROUND

Glass with high transmittance has been employed recently for a wide variety of products, such as light guides, endoscopes, and exposure apparatuses. Of such glass, there may be demands for glass having a moderately high refractive index, particularly a refractive index (nd) ranging from about 1.58 to 1.66, in addition to having a high transmittance.

As glass satisfying such demands, for example, JP60-046945A discloses an optical glass formed substantially from the $SiO_2$—$LaO_3$—BaO—RO—$R'_2O$ system (where R represents Mg, Ca, Sr, Zn, or Pb; and R' represents Li, Na, or K) in which the composition is controlled, thereby achieving an optical glass having an excellent transmittance to light in a short wavelength range, particularly, an optical glass having a coloration degree of 35 to 36 (the coloration degree is the wavelength where the transmittance reaches 80%, expressed in unit of 10 nm). The optical glass has a refractive index substantially within the above range.

CITATION LIST

Patent Literature

PTL 1: JP60-046945A

SUMMARY

Technical Problem

The optical glass disclosed in JP60-046945A, however, has a problem of requiring at least one of PbO and $As_2O_3$ in order to reduce coloration, which negatively affects the environment as an environmental load during its production processing and usage. Additionally, further reduction in coloration has been demanded for these optical glasses.

Here, the present disclosure advantageously solves the aforementioned issues, and is directed to provide an optical glass that does not contain components negatively affecting the environment as environmental loads, and is less colored while having a refractive index maintained moderately high. The present disclosure is also directed to provide an optical element that comprises such an optical glass, and is less colored while having a refractive index maintained moderately high.

Solution to Problem

Solutions to the aforementioned issue are as follows. Specifically, an optical glass of the present disclosure has a composition including, in % by mass,
   30% or more and 47% or less of $SiO_2$;
   0% or more and 10% or less of $B_2O_3$;
   3% or more and 12% or less of $Na_2O$;
   0% or more and 5% or less of $Li_2O$;
   0% or more and 3.8% or less of CaO;
   28% or more and 43% or less of BaO;
   3% or more and 16% or less of ZnO;
   0% or more and 8% or less of $ZrO_2$; and
   0% or more and 15% or less of $La_2O_3$,
   where $Sb_2O_3$ is excluded from the composition,
   wherein the optical glass does not contain any of PbO, $As_2O_3$, and $K_2O$. Such an optical glass does not contain components negatively affecting the environment as environmental loads, and is less colored while having a refractive index maintained moderately high.

Here, "does not contain" a particular component as used therein means that the particular component is not included intentionally; in other words, that particular component is not substantially contained.

The optical glass of the present disclosure preferably has a refractive index (nd) of 1.58 or higher and 1.66 or lower.

The optical glass of the present disclosure preferably has a coloration degree (λ80) of 34 or lower.

The optical glass of the present disclosure preferably has a proportion of the content of BaO in the sum of the contents of MgO, CaO, SrO, and BaO of 91% by mass or more.

The optical glass of the present disclosure preferably does not contain any of MgO and SrO.

The optical glass of the present disclosure preferably contains $Sb_2O_3$ by 1% by mass or less exclusive to a total mass of the optical glass.

The optical glass of the present disclosure is preferably used as a glass for optical fiber cores.

Further, an optical element of the present disclosure comprises the optical glass of the present disclosure. Such an optical element is less colored while having a refractive index maintained moderately high.

Advantageous Effect

In accordance with the present disclosure, an optical glass is provided which does not contain components negatively affecting the environment as environmental loads, and is less colored while having a refractive index maintained moderately high. Additionally, in accordance with the present disclosure, an optical element comprising such an optical glass is provided, which is less colored while having a refractive index maintained moderately high.

DETAILED DESCRIPTION (Optical Glass)

Thereinafter, an optical glass of the present disclosure will be described in more concrete terms.

An optical glass of the present disclosure has a composition including, in % by mass,
   30% or more and 47% or less of $SiO_2$;
   0% or more and 10% or less of $B_2O_3$;
   3% or more and 12% or less of $Na_2O$;
   0% or more and 5% or less of $Li_2O$;
   0% or more and 3.8% or less of CaO;
   28% or more and 43% or less of BaO;
   3% or more and 16% or less of ZnO;
   0% or more and 8% or less of $ZrO_2$; and
   0% or more and 15% or less of $La_2O_3$,
   where $Sb_2O_3$ is excluded from the composition,
   wherein the optical glass does not contain any of PbO, $As_2O_3$, and $K_2O$.

From the perspective of further reducing coloration, preferably, the optical glass of the present disclosure optionally contains $Sb_2O_3$, and has a composition including only, in % by mass,
   30% or more and 47% or less of $SiO_2$;
   0% or more and 10% or less of $B_2O_3$;
   3% or more and 12% or less of $Na_2O$;

0% or more and 5% or less of $Li_2O$;
0% or more and 3.8% or less of CaO;
28% or more and 43% or less of BaO;
3% or more and 16% or less of ZnO;
0% or more and 8% or less of $ZrO_2$; and
0% or more and 15% or less of $La_2O_3$,
where $Sb_2O_3$ is excluded from the composition.

<Components>

First, the reason for limiting the composition of the optical glass to the aforementioned certain ranges in the present disclosure will be described. Unless otherwise stated, the expression "%" used for denoting the amounts of components other than $Sb_2O_3$ described below is % by mass, and is calculated without $Sb_2O_3$, as an optional component of the optical glass, being taken into account (i.e., $Sb_2O_3$ is excluded from the composition).

[$SiO_2$]

$SiO_2$ is one of the essential components of the optical glass of the present disclosure, which forms a network structure of glass, and is capable of reducing crystallization upon glass formation and improving the chemical durability of glass. When the proportion of $SiO_2$ in the optical glass is less than 30%, the aforementioned effects of preventing crystallization and improving the chemical durability may be insufficient. On the other hand, when the proportion of $SiO_2$ in an optical glass exceeds 47%, the viscosity of glass melt increases and the meltability of the glass is reduced, which may increase coloration of the resultant optical glass. Thus, the proportion of $SiO_2$ in the optical glass of the present disclosure is set to be 30% or more and 47% or less. From the similar perspectives, the proportion of $SiO_2$ in the optical glass of the present disclosure is preferably 31% or more and more preferably 32% or more, and is preferably 46% or less and more preferably 45% or less.

[$B_2O_3$]

$B_2O_3$ is an optional component of the optical glass of the present disclosure, which forms a network structure of glass in the manner similar to $SiO_2$, as well as preventing crystallization upon glass formation. Furthermore, $B_2O_3$ is a component that can also promote a batch reaction, and/or modify the viscosity of glass melt, upon fabrication of an optical glass. Nevertheless, when the proportion of $B_2O_3$ in an optical glass exceeds 10%, phase separation may occur and desired performances may not be achieved. Thus, the proportion of $B_2O_3$ in the optical glass of the present disclosure is set to be 0% or more and 10% or less. From the similar perspectives, the proportion of $B_2O_3$ in the optical glass of the present disclosure is preferably 9.5% or less, and is more preferably 9% or less.

[$SiO_2+B_2O_3$]

Here, from the perspective of sufficiently preventing crystallization upon glass formation, the total proportion of $SiO_2$ and $B_2O_3$ in the optical glass of the present disclosure is preferably 37% or more and more preferably 38% or more. Further, from the perspective of achieving a desired refractive index, the total proportion of $SiO_2$ and $B_2O_3$ in the optical glass of the present disclosure is preferably 55% or less and more preferably 53% or less.

[$Na_2O$]

$Na_2O$ is one of the essential components of the optical glass of the present disclosure, which significantly contributes to promote a batch reaction, and/or reduce the viscosity of glass melt upon fabrication of an optical glass, and improve the glass meltability, which leads to an improvement in the transmittance of the optical glass and a reduction in coloration. When the proportion of $Na_2O$ in an optical glass is less than 3%, the aforementioned effects, such as an improvement in the glass meltability, cannot be achieved. On the other hand, when the proportion of $Na_2O$ in an optical glass exceeds 12%, desired performances may not be achieved due to an increased tendency to crystallization upon glass formation. Thus, the proportion of $Na_2O$ in the optical glass of the present disclosure is set to be 3% or more and 12% or less. From the similar perspectives, the proportion of $Na_2O$ in the optical glass of the present disclosure is preferably 3.8% or more, more preferably 4% or more, and even more preferably 5% or more, and is preferably 11% or less and more preferably 10.5% or less.

[$Li_2O$]

$Li_2O$ is an optional component of the optical glass of the present disclosure, providing effects similar to those of $Na_2O$. Additionally, a combination of $Li_2O$ and $Na_2O$ can provide the mixed alkali effect. Nevertheless, when the proportion of $Li_2O$ in an optical glass exceeds 5%, desired performances may not be achieved due to an increased tendency to crystallization upon glass formation. Thus, the proportion of $Li_2O$ in the optical glass of the present disclosure is set to be 0% or more and 5% or less. From the similar perspectives, the proportion of $Li_2O$ in the optical glass of the present disclosure is preferably 4% or less and more preferably 3.5% or less.

[$Na_2O+Li_2O$]

Here, from the perspective of further improving the glass meltability thereby further reducing coloration of an optical glass, the total proportion of $Na_2O$ and $Li_2O$ in the optical glass of the present disclosure is preferably 3.8% or more and more preferably 4% or more.

[$K_2O$]

Like $Na_2O$ and $Li_2O$, $K_2O$ is a component that is an alkali metal oxide and has a tendency to behave in the similar manner as $Na_2O$ and $Li_2O$. However, when $K_2O$ is selected as an alkali metal oxide to be included in an optical glass, a higher melting temperature is required because the viscosity of glass melt increases and hence the glass meltability is reduced at a same temperature as compared to glasses containing $Na_2O$ or $Li_2O$. This negatively affects the transmittance and the coloration degree of an optical glass. Thus, from the perspective of achieving desired performances, the optical glass of the present disclosure is configured not to contain $K_2O$.

[MgO]

MgO is a component that can improve the stability of glass in a small amount. However, MgO raw materials that are readily available from commercial sources often include a transition metal that causes coloration of glass (reduction in the transmittance) as an impurity in a certain amount. Thus, from the perspective of limited availability of a highly-pure raw material and thereby preventing coloration of an optical glass, preferably, MgO is not used upon manufacturing the optical glass of the present disclosure; stated differently, the optical glass of the present disclosure does not contain MgO.

[CaO]

CaO is an optional component of the optical glass of the present disclosure, which can improve the stability and meltability of glass, as well as modifying the refractive index. Nevertheless, when the proportion of CaO in an optical glass exceeds 3.8%, a desired refractive index is difficult to be achieved. In such a case, for achieving a desired refractive index, the refractive index needs to be modified using a component which may reduce the transmittance. Thus, the proportion of CaO in the optical glass of the present disclosure is set to be 0% or more and 3.8% or less. From the similar perspectives, the proportion of CaO in the optical glass of the present disclosure is preferably 3.7% or less and more preferably 3.5% or less.

[SrO]

Like MgO, SrO is a component that can improve the stability of glass in a small amount. However, like MgO, SrO raw materials that are readily available from commercial sources often include a transition metal that causes coloration of glass (reduction in the transmittance) as an impurity in a certain amount. Thus, from the perspective of limited availability of a highly-pure raw material and thereby preventing coloration of an optical glass, preferably, SrO is not used upon manufacturing the optical glass of the present disclosure; stated differently, the optical glass of the present disclosure does not contain SrO.

[BaO]

BaO is one of the essential components of the optical glass of the present disclosure, which can provide effects, such as increasing the refractive index, lowering the melting temperature, and preventing a reduction in the transmittance of short-wavelength light. When the proportion of BaO in an optical glass is less than 28%, the refractive index cannot be increased to a desired refractive index. In addition, the melting temperature is increased, which may inevitably reduce the transmittance of short-wavelength light. On the other hand, when the proportion of BaO in an optical glass exceeds 43%, desired performances may not be achieved due to crystallization caused by reduced stability of glass. Thus, the proportion of BaO in the optical glass of the present disclosure is set to be 28% or more and 43% or less. From the similar perspectives, the proportion of BaO in the optical glass of the present disclosure is preferably 28.5% or more and more preferably 29% or more, and is preferably 42% or less and more preferably 41% or less.

[MgO+CaO+SrO+BaO]

Here, from the perspective of efficiently increasing the refractive index, the total proportion of MgO, CaO, SrO, and BaO in the optical glass of the present disclosure is preferably 28% or more, more preferably 28.5% or more, and even more preferably 29% or more. Further, from the perspective of sufficiently preventing crystallization caused by reduced stability of glass, the total proportion of MgO, CaO, SrO, and BaO in the optical glass of the present disclosure is preferably 43% or less, more preferably 42% or less, and even more preferably 40% or less.

[BaO/(MgO+CaO+SrO+BaO)]

Furthermore, the proportion of the content of BaO in the sum of the contents of MgO, CaO, SrO, and BaO in the optical glass of the present disclosure is preferably 91% by mass or more. The proportion of 91% by mass or more can sufficiently increase the transmittance and reduce coloration, as well as providing optical constants, such as the refractive index, in desired ranges. From the similar perspectives, the proportion of the content of BaO in the sum of the contents of MgO, CaO, SrO, and BaO in the optical glass of the present disclosure is preferably 91.3% or more and more preferably 91.5% or more.

[ZnO]

ZnO is one of the essential components of the optical glass of the present disclosure, which can increase the refractive index of glass, improve the chemical durability of glass, and lower the melting temperature. When the proportion of ZnO in an optical glass is less than 3%, a desired refractive index may not be provided. On the other hand, when the proportion of ZnO in an optical glass exceeds 16%, desired performances may not be achieved due to crystallization caused by reduced stability of glass. Thus, the proportion of ZnO in the optical glass of the present disclosure is set to be 3% or more and 16% or less. From the similar perspectives, the proportion of ZnO in the optical glass of the present disclosure is preferably 4% or more and more preferably 5% or more, and is preferably 15% or less and more preferably 13.5% or less.

[$ZrO_2$]

$ZrO_2$ is an optional component of the optical glass of the present disclosure, which can enhance the refractive index of glass while preventing a reduction in the transmittance of short-wavelength light, and can improve the chemical durability of glass. Nevertheless, when the proportion of $ZrO_2$ in an optical glass exceeds 8%, the melting temperature is elevated, and desired performances may not be achieved due to crystallization caused by reduced stability of glass. Thus, the proportion of $ZrO_2$ in the optical glass of the present disclosure is set to be 0% or more and 8% or less. From the similar perspectives, the proportion of $ZrO_2$ in the optical glass of the present disclosure is preferably 7% or less and more preferably 6% or less.

[$La_2O_3$]

$La_2O_3$ is an optional component of the optical glass of the present disclosure, which can enhance the refractive index of glass while reducing a reduction in the transmittance of short-wavelength light to a certain degree, and can improve the chemical durability of glass. Nevertheless, when the proportion of $La_2O_3$ in an optical glass exceeds 15%, desired performances may not be achieved due to crystallization caused by reduced stability of glass. Thus, the proportion of $La_2O_3$ in the optical glass of the present disclosure is set to be 0% or more and 15% or less. From the similar perspectives, the proportion of $La_2O_3$ in the optical glass of the present disclosure is preferably 12% or less and more preferably 10.5% or less.

[$ZrO_2$+$La_2O_3$]

Here, from the perspective of efficiently increasing the refractive index, the total proportion of $ZrO_2$ and $La_2O_3$ in the optical glass of the present disclosure is preferably 0.5% or more. Further, from the perspective of sufficiently preventing crystallization caused by reduced stability of glass, the total proportion of $ZrO_2$ and $La_2O_3$ in the optical glass of the present disclosure is preferably 15% or less and more preferably 13% or less.

[$Nb_2O_5$, $Ta_2O_5$]

$Na_2O_5$ and $Ta_2O_5$ are components that can increase the refractive index, but may reduce the transmittance of short-wavelength light. Thus, from the perspective of preventing coloration, the optical glass of the present disclosure preferably does not contain any of $Na_2O_5$ and $Ta_2O_5$.

[$Sb_2O_3$ and Defoaming Component]

The optical glass of the present disclosure may optionally contain a small amount (e.g., 1% by mass or less exclusive to the total mass of the optical glass) of $Sb_2O_3$ that may function as a clarifying agent during production.

Additionally, the optical glass of the present disclosure may optionally contain a small amount (e.g., in an amount of 1% or less inclusive to the optical glass) an industrially well-known defoaming component.

[PbO, $As_2O_3$]

PbO and $As_2O_3$ are highly poisonous, and thus limit the range of applications to products and negatively affect the environment as environmental loads during production processing and usage of glass. Thus, the optical glass of the present disclosure is configured not to contain any of PbO and $As_2O_3$.

[Other Components]

The optical glass of the present disclosure may include components other than the components described above as long as the objects of the present disclosure are not deviated, and examples of other components include $GeO_2$, $Y_2O_3$, $Gd_2O_3$, $Ga_2O_3$, and $In_2O_3$.

<Refractive Index (nd)>

The optical glass of the present disclosure having the aforementioned composition preferably has a refractive index (nd) of 1.58 or higher and 1.66 or lower. When the refractive index of the optical glass is within the range described above, the optical glass can suitably enhance the numerical aperture (NA) of optical fibers when the optical glass is used for optical fiber cores, for example. Additionally, the refractive index (nd) of the optical glass is preferably 1.59 or higher, and is preferably 1.65 or lower and more preferably 1.64 or lower.

The refractive index (nd) of the optical glass may be controlled by adjusting the content(s) of a component(s) that may affect the refractive index, while maintaining the entire composition within the certain ranges during preparation of the optical glass, for example.

<Color Degree (λ80)>

The coloration degree (λ80) of the optical glass of the present disclosure having the aforementioned composition is preferably 34 or lower. It is considered that coloration of an optical glass is sufficiently low when the coloration degree (λ80) of the optical glass is 34 or lower. Such an optical glass can be preferably used as a glass for optical fibers, particularly as a glass for cores of long haul transmission optical fibers, for example.

The coloration degree (λ80) of the optical glass can be controlled by adjusting the content(s) of a component(s) that may affect the coloration degree and the transmittance, while maintaining the entire composition within the certain ranges during preparation of the optical glass, for example.

Furthermore, "the coloration degree (λ80) of an optical glass" as used herein refers to a value determined as follows. A 10-mm thick sample of an optical glass, the both sides of which have been polished, is prepared. The spectral transmittance (including reflection loss) of the sample is measured. The coloration degree (λ80) is determined as the wavelength at which the spectral transmittance reaches 80%, which is rounded off at the first figure of decimal position, and is expressed in unit of 10 nm.

<Manufacturing of Optical Glass>

A method of manufacturing an optical glass of the present disclosure is not particularly limited as long as the optical glass satisfies the aforementioned requirement for the components, and conventional manufacturing methods may be used.

For example, initially, as raw materials of components that may be contained in the optical glass of the present disclosure, oxides, hydroxides, carbonates, nitrates, and the like, are procured and weighed to a certain proportion, and are uniformly mixed to yield a glass preparation law material. The raw material is then loaded into a heat resistant vessel that is non-reactive to the glass raw material or the like, such as a crucible made from platinum, alumina, quartz, or the like, for example, and is molten by heating at 1000° C. to 1400° C. in an electric furnace, stirred at suitable timing, refined, and homogenized. The molten product is then cast into a mold that is preheated at a suitable temperature, and is allowed to cool slowly in the electric furnace to thereby eliminate strains, to yield an optical glass of the present disclosure.

<Applications of Optical Glass>

The optical glass of the present disclosure may be used for, but are not limited to, optical elements, such as a wide variety of lenses; optical fibers; and filter substrates, for example. Particularly, because the glass of the present disclosure is less colored while having a refractive index maintained moderately high, it can be suitably used as a glass for cores of long haul transmission optical fibers, thereby manufacturing optical fibers having larger numeric aperture.

(Optical Element)

An optical element of the present disclosure comprises an optical glass of the present disclosure. Because the optical glass of the present disclosure is used for the optical element of the present disclosure, the optical element is less colored while having a refractive index maintained moderately high.

From the perspective of obtaining desired performances, the optical element of the present disclosure preferably satisfies the essential requirements of the composition of the components set forth above regarding the optical glass of the present disclosure, and more preferably satisfies the preferred requirements set forth above regarding the optical glass of the present disclosure.

Examples of the types of optical elements typically include, but are not limited to, lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with diffraction gratings; prisms; and prisms with lens functions. Examples of optical elements preferably include lenses, such as convex meniscus lenses, concave meniscus lenses, biconvex lenses, biconcave lenses, plano-convex lenses, and plano-concave lenses; prisms; and diffraction gratings. The above-described lenses may be aspherical lenses or spherical lenses. An antireflection film, a wavelength-selective partial reflection film, or the like, may be provided on a surface as required.

Note that a method of manufacturing an optical element is not particularly limited as long as the optical glass of the present disclosure is used as a raw material, and conventional manufacturing methods may be used. For example, an optical element may be manufactured by melting an optical glass of the present disclosure, preparing a preform (a glass material that has been formed in advance) from the resultant molten glass, and precision press molding the preform.

EXAMPLES

While an optical glass of the present disclosure will be described in more concrete terms with reference to Examples and Comparative Examples below, the present disclosure is not limited to Examples.

Oxides, hydroxides, carbonates, nitrates, and the like, corresponding to the components listed in Table 1 were procured and then weighed such that they weighed 100 g after vitrification, and were uniformly mixed to yield a glass preparation law material. The raw material was then loaded into a platinum crucible, molten by heating at 1000° C. to 1400° C. in an electric furnace, and stirred at suitable timing to be homogenized. The homogenized molten product was then cast into a preheated mold, and was allowed to cool slowly in the electric furnace, to yield each of optical glasses of Examples 1 to 14 and Comparative Examples 1 to 2.

The refractive index (nd) and the coloration degree (λ80) of each optical glass were then measured. The refractive indices (nd) were measured using Precision Refractometer KPR-200 available from Kalnew Optical Industrial Co., Ltd. Each coloration degree (λ80) was determined as follows. A 10-mm thick sample of each optical glass, the both sides of which had been polished, was prepared. The spectral transmittance including reflection loss of the sample was measured using a spectrophotometer U-4100 available from Hitachi High-Technologies Corporation. The coloration degree (λ80) was determined as the wavelength at which the spectral transmittance reached 80%. The results are listed in Table 1.

TABLE 1

|  |  | Example 1 | Example 2 | Example 3 | Example 4 | Example 5 | Example 6 | Example 7 | Example 8 |
|---|---|---|---|---|---|---|---|---|---|
| $SiO_2$ | % by mass | 43.00 | 42.00 | 41.00 | 44.13 | 39.00 | 43.00 | 38.00 | 39.00 |
| $B_2O_3$ |  | 0 | 4.00 | 2.00 | 6.15 | 1.00 | 0.00 | 1.00 | 1.00 |
| $Na_2O$ |  | 10.00 | 5.00 | 9.00 | 5.59 | 7.00 | 6.00 | 6.00 | 7.00 |
| $Li_2O$ |  | 0 | 0 | 0 | 0 | 0 | 3.00 | 0 | 0 |
| $K_2O$ |  | 0 | 0 | 0 | 0 | 0 | 0 | 0 | 0 |
| MgO |  | 0 | 0 | 0 | 0 | 0 | 0 | 0 | 0 |
| CaO |  | 2.00 | 0 | 2.00 | 0 | 0 | 2.00 | 0 | 0 |
| SrO |  | 0 | 0 | 0 | 0 | 0 | 0 | 0 | 0 |
| BaO |  | 30.00 | 38.00 | 33.00 | 34.63 | 39.00 | 30.00 | 39.00 | 34.00 |
| ZnO |  | 12.00 | 6.00 | 7.00 | 8.94 | 10.00 | 12.00 | 10.00 | 10.00 |
| $ZnO_2$ |  | 3.00 | 1.00 | 3.00 | 0.56 | 0 | 4.00 | 0 | 0 |
| $La_2O_2$ |  | 0 | 4.00 | 3.00 | 0 | 4.00 | 0 | 6.00 | 9.00 |
| PbO |  | 0 | 0 | 0 | 0 | 0 | 0 | 0 | 0 |
| $As_2O_3$ |  | 0 | 0 | 0 | 0 | 0 | 0 | 0 | 0 |
| Total |  | 100.0 | 100.0 | 100.0 | 100.0 | 100.0 | 100.0 | 100.0 | 100.0 |
| $Sb_2O_3$ | % by mass (external) | 0 | 0 | 0 | 0 | 0.20 | 0 | 0.20 | 0.20 |
| $SiO_2 + B_2O_3$ | % by mass | 43.00 | 46.00 | 43.00 | 50.28 | 40.00 | 43.00 | 39.00 | 40.00 |
| $Na_2O + Li_2O$ |  | 10.00 | 5.00 | 9.00 | 5.59 | 7.00 | 9.00 | 6.00 | 7.00 |
| $ZnO_2 + La_2O_3$ |  | 3.00 | 5.00 | 6.00 | 0.56 | 4.00 | 4.00 | 6.00 | 9.00 |
| MgO + CaO + SrO + BaO |  | 32.0 | 38.0 | 35.0 | 34.6 | 39.0 | 32.0 | 39.0 | 34.0 |
| BaO/(MgO + CaO + SrO + BaO) |  | — | 0.94 | 1.00 | 0.94 | 1.00 | 1.00 | 0.94 | 1.00 | 1.00 |
| Refractive index (nd) |  | 1.60634 | 1.61181 | 1.61363 | 1.59513 | 1.63523 | 1.61966 | 1.62725 | 1.62475 |
| Coloration degree (λ80) |  | 34 | 34 | 34 | 33 | 34 | 34 | 34 | 34 |

|  |  | Example 9 | Example 10 | Example 11 | Example 12 | Example 13 | Example 14 | Comparative Example 1 | Comparative Example 2 |
|---|---|---|---|---|---|---|---|---|---|
| $SiO_2$ | % by mass | 42.00 | 41.00 | 41.00 | 41.00 | 35.00 | 33.00 | 42.13 | 32.00 |
| $B_2O_3$ |  | 4.00 | 8.90 | 5.00 | 2.00 | 6.00 | 7.00 | 0 | 6.00 |
| $Na_2O$ |  | 5.00 | 5.60 | 4.00 | 9.00 | 6.00 | 7.00 | 3.01 | 2.00 |
| $Li_2O$ |  | 0 | 0 | 0 | 0 | 0 | 0 | 0 | 0 |
| $K_2O$ |  | 0 | 0 | 0 | 0 | 0 | 0 | 4.01 | 4.00 |
| MgO |  | 0 | 0 | 0 | 0 | 0 | 0 | 0 | 0 |
| CaO |  | 0 | 0 | 1.00 | 2.00 | 3.00 | 0 | 17.05 | 8.00 |
| SrO |  | 0 | 0 | 0 | 0 | 0 | 0 | 0 | 0 |
| BaO |  | 33.00 | 35.00 | 38.00 | 31.00 | 32.50 | 39.00 | 20.06 | 28.00 |
| ZnO |  | 6.00 | 9.00 | 6.00 | 7.00 | 7.00 | 10.00 | 4.71 | 3.70 |
| $ZnO_2$ |  | 1.00 | 0.50 | 1.00 | 5.00 | 3.50 | 0 | 0 | 0 |
| $La_2O_2$ |  | 9.00 | 0 | 4.00 | 3.00 | 7.00 | 4.00 | 8.02 | 16.00 |
| PbO |  | 0 | 0 | 0 | 0 | 0 | 0 | 1.00 | 0 |
| $As_2O_3$ |  | 0 | 0 | 0 | 0 | 0 | 0 | 0 | 0.30 |
| Total |  | 100.0 | 100.0 | 100.0 | 100.0 | 100.0 | 100.0 | 100.0 | 100.0 |
| $Sb_2O_3$ | % by mass (external) | 0.20 | 0 | 0 | 0 | 0.20 | 0.20 | 0.30 | 0 |
| $SiO_2 + B_2O_3$ | % by mass | 46.00 | 49.90 | 46.00 | 43.00 | 41.00 | 40.00 | 42.13 | 38.00 |
| $Na_2O + Li_2O$ |  | 5.00 | 5.60 | 4.00 | 9.00 | 6.00 | 7.00 | 3.01 | 2.00 |
| $ZnO_2 + La_2O_3$ |  | 10.00 | 0.50 | 5.00 | 8.00 | 10.50 | 4.00 | 8.02 | 16.00 |
| MgO + CaO + SrO + BaO |  | 33.0 | 35.0 | 39.0 | 33.0 | 35.5 | 39.0 | 37.1 | 36.0 |
| BaO/(MgO + CaO + SrO + BaO) |  | — | 1.00 | 1.00 | 0.97 | 0.94 | 0.92 | 1.00 | 0.54 | 0.78 |
| Refractive index (nd) |  | 1.61679 | 1.60073 | 1.61613 | 1.61623 | 1.63804 | 1.62640 | 1.6201 | 1.6483 |
| Coloration degree (λ80) |  | 34 | 34 | 34 | 34 | 34 | 34 | 35 | 36 |

As can be seen from Table 1, because each of the optical glasses of Examples 1 to 14 in accordance with the present disclosure had the compositions within the aforementioned certain ranges, they had moderately high refractive indices (nd) from 1.58 to 1.66 and the coloration degrees (λ80) of 34 or lower, indicating reduced coloration.

INDUSTRIAL APPLICABILITY

In accordance with the present disclosure, an optical glass is provided which does not contain components negatively affecting the environment as environmental loads, and is less colored while having a refractive index maintained moderately high. Additionally, in accordance with the present disclosure, an optical element comprising such an optical glass is provided, which is less colored while having a refractive index maintained moderately high.

The invention claimed is:
1. An optical glass having a composition including only, in % by mass:
30% or more and 47% or less of $SiO_2$;
0% or more and 10% or less of $B_2O_3$;
3% or more and 12% or less of $Na_2O$;
0% or more and 5% or less of $Li_2O$;
0% or more and 3.8% or less of CaO;
28% or more and 43% or less of BaO;
3% or more and 16% or less of ZnO;
0.5% or more and 8% or less of $ZrO_2$; and
0% or more and 15% or less of $La_2O_3$,
wherein the composition optionally includes $Sb_2O_3$, where the proportions of $SiO_2$, $B_2O_3$, $Na_2O$, $Li_2O$, CaO, BaO, ZnO, $ZrO_2$, and $La_2O_3$, are relative to the sum of the contents of the components except for $Sb_2O_3$, if included, constituting the composition, and the optical glass has a proportion of a content of BaO in a sum of contents of CaO and BaO of 91.5% by mass or more.

2. The optical glass of claim 1 having a refractive index (nd) of 1.58 or higher and 1.66 or lower.

3. The optical glass of claim 2 having a coloration degree ($\lambda$ 80) of 34 or lower.

4. An optical element comprising the optical glass of claim 2.

5. The optical glass of claim 2 containing $Sb_2O_3$, where a content of $Sb_2O_3$ is 1% by mass or less with respect to 100% by mass of the composition.

6. The optical glass of claim 1 having a coloration degree ($\lambda$ 80) of 34 or lower.

7. An optical element comprising the optical glass of claim 6.

8. The optical glass of claim 6 containing $Sb_2O_3$, where a content of $Sb_2O_3$ is 1% by mass or less with respect to 100% by mass of the composition.

9. An optical element comprising the optical glass of claim 1.

10. The optical glass of claim 1 containing $Sb_2O_3$, wherein a content of $Sb_2O_3$ is 1% by mass or less with respect to 100% by mass of the composition.

11. The optical glass of claim 1, wherein a proportion of $Na_2O$ is 5% or more.

12. The optical glass of claim 1, wherein a proportion of $Na_2O$ is 5.59% or more.

13. The optical glass of claim 1, wherein a total proportion of $Na_2O$ and $Li_2O$ is 5% or more.

14. The optical glass of claim 1, wherein a total proportion of $Na_2O$ and $Li_2O$ is 5.59% or more.

15. The optical glass of claim 1, wherein a proportion of $La_2O_3$ is 7% or more.

16. The optical glass of claim 1, wherein a proportion of BaO is 30% or more and 39% or less.

17. The optical glass of claim 1, wherein a proportion of BaO is 39% or less and a proportion of $SiO_2$ is 42% or less.

* * * * *